United States Patent
Meyer et al.

(10) Patent No.: US 8,975,323 B2
(45) Date of Patent: Mar. 10, 2015

(54) UV LASER MARKABLE THERMOPLASTIC ELASTOMER COMPOUND

(75) Inventors: Gerald W. Meyer, Crystal Lake, IL (US); Santosh Bawiskar, Crystal Lake, IL (US); Jiren Gu, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 169 days.

(21) Appl. No.: 13/580,567

(22) PCT Filed: Feb. 16, 2011

(86) PCT No.: PCT/US2011/025103
§ 371 (c)(1), (2), (4) Date: Aug. 22, 2012

(87) PCT Pub. No.: WO2011/103200
PCT Pub. Date: Aug. 25, 2011

(65) Prior Publication Data
US 2012/0316280 A1 Dec. 13, 2012

Related U.S. Application Data

(60) Provisional application No. 61/306,643, filed on Feb. 22, 2010.

(51) Int. Cl.
| | | |
|---|---|---|
| *C08L 53/00* | (2006.01) | |
| *C08L 23/10* | (2006.01) | |
| *C08K 3/22* | (2006.01) | |
| *B65D 39/00* | (2006.01) | |
| *C08K 5/00* | (2006.01) | |

(52) U.S. Cl.
CPC ............ *C08L 53/00* (2013.01); *B65D 39/0011* (2013.01); *C08K 3/22* (2013.01); *C08K 5/0016* (2013.01); *C08L 23/10* (2013.01); *C08L 2205/025* (2013.01); *C08L 2205/03* (2013.01)
USPC ........... 524/432; 524/505; 264/400; 264/409; 430/363

(58) Field of Classification Search
CPC ..... B65D 39/0011; C08L 53/00; C08L 23/10; C08K 3/22; C08K 5/0016
USPC ............ 524/432, 505; 264/400, 409; 430/363
See application file for complete search history.

(56) References Cited

U.S. PATENT DOCUMENTS

| | | |
|---|---|---|
| 5,053,440 A | 10/1991 | Schueler et al. |
| 5,206,280 A | 4/1993 | Williams |
| 6,586,518 B1 | 7/2003 | Kita et al. |
| 2007/0295689 A1* | 12/2007 | Clauss et al. ............. 216/65 |

FOREIGN PATENT DOCUMENTS

| | | |
|---|---|---|
| CA | 2086023 A | 7/1993 |
| GB | 2352824 A | 2/2001 |
| JP | 61072049 A | 4/1986 |
| JP | 10237319 A | 9/1998 |
| JP | 10305661 A | 11/1998 |
| JP | 11020316 A | 1/1999 |
| WO | WO2006101966 A | 9/2006 |

* cited by examiner

*Primary Examiner* — James J Seidleck
*Assistant Examiner* — Deve E Valdez
(74) *Attorney, Agent, or Firm* — John H. Hornickel; Michael J. Sambrook

(57) ABSTRACT

A thermoplastic elastomer (TPE) is disclosed which is markable by a laser operating at an ultra-violet wavelength because of the presence of between about 0.05 and about 0.1 weight percent of titanium dioxide or between about 0.1 and 0.3 weight percent of zinc oxide.

19 Claims, No Drawings

UV LASER MARKABLE THERMOPLASTIC ELASTOMER COMPOUND

CLAIM OF PRIORITY

This application claims priority from U.S. Provisional Patent Application Ser. No. 61/306,643 and filed on Feb. 22, 2010, which is incorporated by reference.

FIELD OF THE INVENTION

This invention relates to markable thermoplastic elastomers, polymer compounds which exhibit elasticity while remaining thermoplastic, which also can be marked with lasers having wavelengths in the ultra-violet (UV) electromagnetic range.

BACKGROUND OF THE INVENTION

The world of polymers has progressed rapidly to transform material science from wood and metals of the 19$^{th}$ Century to the use of thermoset polymers of the mid-20$^{th}$ Century to the use of thermoplastic polymers of later 20$^{th}$ Century.

Thermoplastic elastomers (TPEs) combine the benefits of elastomeric properties of thermoset polymers, such as vulcanized rubber, with the processing properties of thermoplastic polymers.

Recently, a new type of TPE has become available, namely: ethylene/alpha-olefin interpolymers as disclosed in PCT Patent Publications WO 2006/101966; WO 2006/102155; WO 2006/101999; WO 2006/101928; and WO 2006/101924 all filed by Dow Global Technologies and all incorporated by reference as if fully rewritten herein.

During manufacturing, particularly in the food and medical industries, it is important to provide a mechanism for individual products to be marked with indications of serial number, lot number, production control numbers, etc., in order to provide sufficient information on the product for regulatory purposes, inventory control purposes, working capital management, purposes, and unfortunately if necessary, product recall purposes.

British Patent Publication GB2352824 (abandoned) discloses a TPE and pigment for UV laser marking. The pigment range identified as useful is 0.5-5 weight percent of the total compound. Because the pigment for UV laser marking is a key ingredient, its cost affects the price and acceptability of using UV laser marking upon a TPE. But as stated in GB2352824, laser marking using UV wavelengths is far preferable over using lasers of other wavelengths which scar or burn the information into the surface of the TPE.

SUMMARY OF THE INVENTION

What the art needs is a UV laser markable TPE which generates a visible image on the surface of the TPE shaped article, using a minimum of laser marking ingredients but without scarring the surface of the TPE shaped article. The art needs an economical way of making UV laser markable TPE compounds.

The present invention solves the problem by formulating a TPE that utilizes a minimal amount of laser marking ingredient(s) excitable and transformable in the ultra violet range to generate a mark on the surface of the TPE.

One aspect of the invention is a UV laser markable thermoplastic elastomer compound, comprising: (a) a non-elastomeric polyolefin; (b) a non-crosslinked elastomer; and (c) a laser marking ingredient active in the range of wavelength of a UV laser, selected from the group consisting of (1) titanium dioxide present in an amount of from about 0.05 to about 0.1 weight percent of the compound and (2) zinc oxide present in an amount of from about 0.1 to 0.3 weight percent of the compound.

Another aspect of the invention is a UV laser markable TPE article made from the compound, both before and after activation of the laser marking ingredient.

Features of the invention will become apparent with reference to the following embodiments.

EMBODIMENTS OF THE INVENTION

Thermoplastic Elastomer Compound

The TPE of the present invention is a mixture of a non-elastomeric polyolefin and a non-crosslinked elastomer. The non-crosslinked elastomer is likely the continuous phase, with the non-elastomeric polyolefin comprising the discontinuous phase. Most TPEs commercially available fit that description. The non-crosslinked elastomer can be either a styrene block copolymer (SBC) or an olefin block copolymer (OBC).

SBC

Non-limiting examples of SBC include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. These examples of SBC may or may not be maleated but have weight average molecular weights in excess of 75,000 and preferably in excess of 200,000. Of possible SBC candidates, styrene-ethylene-butylene-styrene (SEBS) is particularly useful because the olefinic mid-block is capable of holding large amounts of plasticizing oil.

Commercially available grades of these SBC polymers are made by Kraton Polymers (Houston, Tex., USA) and marketed using the Kraton brand. Of the preferred SEBS, those presently preferred grades are Kraton G1651HU, Kraton G1650, Kraton G1652, and Kraton G1654H (a linear triblock copolymer based on styrene and ethylene/butylene with a polystyrene content between 29.5 and 33.0, a specific gravity of 0.92, and a Shore A hardness between 60 to 73.

OBC

The PCT publications identified in the Background above recite many attributes and features of these new ethylene/alpha-olefin interpolymers, also known in the industry as olefin block copolymers or OBC.

Without departing from reliance on the original documentation about these new type of thermoplastic elastomers as contained in the PCT publications identified above, briefly, they can be characterized as follows, in a recitation from PCT Publication WO/2006/101966:

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process, The term "crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, RL and an upper limit, Ru, is disclosed, any number falling within the range is specifically disclosed. In particular, the following numbers within the range are specifically disclosed: R=RL+ k*(Ru−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a new class of ethylene/α-olefin block interpolymers (hereinafter "inventive polymer", "ethylene/α-olefin interpolymers", or variations thereof). The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)n where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprises all or substantially all ethylene. "Soft" segments, on the other hand, refer to blocks of polymerized units in which the comonomer content is greater than 5 weight percent, preferably greater than 8 weight percent, greater than 10 weight percent, or greater than 15 weight percent. In some embodiments, the comonomer content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the block copolymers usually do not have a structure like:

AAA-AA-BBB-BB

In other embodiments, the block copolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

In one aspect, the ethylene/α-olefin interpolymers used in embodiments of the invention have a Mw/Mn from about 1.7 to about 3.5 and at least one melting point, Tm, in degrees Celsius and density, d, in grams/cubic centimeter, wherein the numerical values of the variables correspond to the relationship:

$Tm > -2002.9 + 4538.5(d) - 2422.2(d)2$, and preferably $Tm > -6288.1 + 13141(d) - 6720.3(d)2$, and more preferably $Tm > 858.91 - 1825.3(d) + 1112.8(d)2$.

Unlike the traditional random copolymers of ethylene/α-olefins whose melting points decrease with decreasing densities, these interpolymers (represented by diamonds) exhibit melting points substantially independent of the density, particularly when density is between about 0.87 g/cc to about 0.95 g/cc. For example, the melting point of such polymers are in the range of about 110 0 C to about 130 0 C when density ranges from 0.875 g/cc to about 0.945 g/cc. In some embodiments, the melting point of such polymers are in the range of about 115° C. to about 125° C. when density ranges from 0.875 g/cc to about 0.945 g/cc.

In another aspect, the ethylene/α-olefin interpolymers comprise, in polymerized form, ethylene and one or more a-olefins and are characterized by a ΔT, in degree Celsius, defined as the temperature for the tallest Differential Scanning calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T > -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 3O0 C, and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re > 1491 - 1629(d); \text{ and more preferably}$$

$$Re > 1501 - 1629(d); \text{ and even more preferably}$$

$$Re \geq 1511 - 1629(d).$$

In some embodiments, the ethylene/α-olefin interpolymers have a tensile strength above 10 MPa, preferably a tensile strength >11 MPa, more preferably a tensile strength >13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot2 (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the inventive block interpolymers have additional characteristics or properties. In one aspect, the interpolymers, preferably comprising ethylene and one or more copolymerizable comonomers in polymerized form, are characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the interpolymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymer has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

The multi-block polymers typically comprise various amounts of "hard" and "soft" segments.

"Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene.

"Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR.

From PCT Publication WO 2006/101966 comes additional ways to characterize the interpolymers useful in the present invention:

The ethylene/α-olefin interpolymer comprises polymerized units of ethylene and α-olefin, wherein the interpolymer is characterized by an average block index greater than zero and up to about 1.0 and a molecular weight distribution, Mw/Mn, greater than about 1.3. It also comprises polymerized units of ethylene and α-olefin, wherein the average block index is greater than 0 but less than about 0.4 and a molecular weight distribution, Mw/Mn, greater than about 1.3, and preferably wherein the average block index is in the range from about 0.1 to about 0.3 or more preferably wherein the average block index is in the range from about 0.4 to about 1.0, even more preferably wherein the average block index is in the range from about 0.3 to about 0.7, yet more preferably wherein the average block index is in the range from about 0.6 to about 0.9, and optimally wherein the average block index is in the range from about 0.5 to about 0.7.

The interpolymer can have a density of less than about 0.91 g/cc and desirably a density in the range from about 0.86 g/cc to about 0.91 g/cc.

The α-olefin can be styrene, propylene, 1-butene, 1-hexene, 1-octene, 4-methyl-1-pentene, norbornene, 1-decene, 1,5-hexadiene, or a combination thereof. Preferably, the α-olefin is 1-butene or 1-octene.

Desirably, the ethylene/α-olefin interpolymer can have a Mw/Mn greater than about 1.5, desirably, greater than about 2.0, preferably from about 2.0 to about 8, and more preferably from about 1.7 to about 3.5.

The ethylene/α-olefin interpolymer can also be characterized by at least one melting point, Tm, in degrees Celsius, and a density, d, in grams/cubic centimeter, wherein the numerical values of Tm and d correspond to the relationship:

$$Tm>-2002.9+4538.5(d)-2422.2(d)2$$

The ethylene/α-olefin interpolymer can also be characterized by an elastic recovery, Re, in percent at 300 percent strain and 1 cycle measured with a compression-molded film of the ethylene/α-olefin interpolymer, and a density, d, in grams/cubic centimeter, wherein the numerical values of Re and d satisfy the following relationship when ethylene/α-olefin interpolymer is substantially free of a cross-linked phase:

$$Re>1481-1629(d)$$

The interpolymer can also be characterized by having at least one fraction obtained by Temperature Rising Elution Fractionation ("TREF"), wherein the fraction has a block index greater than about 0.3 and up to about 1.0 and the ethylene/α-olefin interpolymer has a molecular weight distribution, Mw/Mn, greater than about 1.3.

The interpolymer can also be characterized by having at least one fraction obtained by TREF, wherein the fraction has a block index greater than about 0 and up to about 0.4 and the ethylene/α-olefin interpolymer has a molecular weight distribution, Mw/Mn, greater than about 1.3.

Desirably, the block index of the fraction is greater than about 0.4, more desirably greater than about 0.5, preferably greater than about 0.6, more preferably greater than about 0.7, even more preferably greater than about 0.8, yet more preferably greater than about 0.9.

The interpolymer can have an ethylene content is greater than 50 mole percent with one or more hard segments and one or more soft segments.

Desirably, the hard segments are present in an amount from about 5% to about 85% by weight of the interpolymer.

Desirably, the hard segments comprise at least 98% of ethylene by weight. Desirably, the soft segments comprise less than 90% of ethylene by weight. Also desirably, the soft segments comprise less than 50% of ethylene by weight.

Preferably, the interpolymer comprises at least 10 hard and soft segments connected in a linear fashion to form a linear chain. Even more preferably, the hard segments and soft segments are randomly distributed along the chain. Most preferably, the hard segments do not include a tip segment. Alternatively, the soft segments do not include a tip segment.

The ethylene/alpha-olefin interpolymers useful in the present invention are commercially available from Dow Chemical Company of Midland, Mich. Two grades are particularly preferred: D9100 and D9007.10, particularly together because of the balance of physical and rheological properties.

Non-Elastomeric Olefin Polymer

The thermoplastic elastomer compound also includes an olefin polymer selected from the group consisting of a homopolymer of propylene and a random copolymer of propylene and ethylene.

Homopolymers of propylene (hPP) are commercially available and any of them is a candidate for use in this invention.

The hPP can have a melt index value according to ASTM D 1238 ranging from about 0.5 to about 200, and preferably from about 4 to about 50 g/10 min; a tensile strength at yield according to ASTM D 638 (50 mm/min.) ranging from about 15 to about 50, and preferably from about 20 to about 40 MPa; an elongation at break according to ASTM D 638 (50 mm/min.) ranging from about 1 to about 500, and preferably from about 10 to about 300 MPa; a flexural modulus according to ASTM 790 ranging from about 300 to about 3000, and preferably from about 500 to about 2000 MPa; a Notched-Izod impact strength according to ASTM D 256 ranging from about 0.2 to about 10, and preferably from about 0.5 to about 5 ft-lb/in; a Heat-Deflection Temperature according to ASTM D648 (at 66 psi) ranging from about 60 to about 150, and preferably from about 70 to about 120° C.

Presently preferred as a commercially available hPP are a combination of hPP resins from Lyondell-Basell and Formosa Plastics, namely: Profax PD702 (MFI=35) and Formalene 1102KR (MFI=4), respectively. A mixture of these two different hPPs is preferred because of the balance of melt strength and rheological properties.

Random polypropylene copolymers (rPP) are commercially available and any of them is a candidate for use in this invention. The comonomer can be selected from the group consisting of ethylene, butene, hexene, octane, etc.

The rPP can have a melt index value according to ASTM D 1238 ranging from about 0.5 to about 200, and preferably from about 4 to about 50 g/10 min; a tensile strength at yield according to ASTM D 638 (50 mm/min.) ranging from about 15 to about 50, and preferably from about 20 to about 40 MPa; an elongation at break according to ASTM D 638 (50 mm/min.) ranging from about 1 to about 500, and preferably from about 10 to about 300 MPa; a flexural modulus according to ASTM 790 ranging from about 300 to about 3000, and preferably from about 500 to about 2000 MPa; a Notched-Izod impact strength according to ASTM D 256 ranging from about 0.2 to about 10, and preferably from about 0.5 to about 5 ft-lb/in; a Heat-Deflection Temperature according to ASTM D648 (at 66 psi) ranging from about 60 to about 150, and preferably from about 70 to about 120° C.

Presently preferred as a commercially available rPP is Fina 7823M Polypropylene Random Copolymer Resin from Total (MFI=30).

Both rPP and hPP can optionally be nucleated to improve their properties of rate of crystallization and clarity.

Laser Marking Ingredients

Unexpectedly, it has been found that an amount of laser marking ingredient below that disclosed or suggested by GB2352824 provides perceptibly visible marks when exposed to a UV laser such as that disclosed by GB2352824. Whereas the disclosure of GB2352824 expresses a lower limit of 0.5 weight percent of the total TPE compound, the present invention employs no more than 0.30 weight percent of the total TPE compound. Even when considering the disclosure of the abstract of JP61072049 which identifies a theoretical lowest level as 0.33 weight percent, the present invention surpasses that disclosure in terms of efficient use of expensive laser marking ingredient.

Two different types of laser marking ingredients have been determined to be acceptable in amounts as low as 0.05%, an order of magnitude lower than the minimum amount taught by GB2352824 and less than 20% of the amount conceivably disclosed by JP61072049.

The first type of laser marking ingredient suitable for use in the present invention is titanium dioxide ($TiO_2$), preferably in a particle size as small as commercially available. The $TiO_2$ may be either in the rutile or anatase crystal structure or a combination of the crystal structures.

Non-limiting examples of commercially available $TiO_2$ include CSEBS 446 (White) Color Concentrate from ECM of Worcester, Mass., USA and MT-100S micronized $TiO_2$ from Tayca Corporation of Japan. In the case of the color concentrates, the amount of $TiO_2$ in the color concentrate is determinative of acceptability in the present invention.

The second type of laser marking ingredient is zinc oxide (ZnO), preferable in a particle size as small as commercially available. A non-limiting example of a commercially available ZnO in a nanometric size particle is ZEHT1003PP zinc oxide nanoparticles dispersed in polypropylene, from Nanophase Technologies Corporation of Romeoville, Ill., USA. As with the ECM color concentrate above, the amount of ZnO nanoparticles in the Nanophase product is determinative of acceptability in the present invention.

Acceptable amounts of laser markable ingredient can be any of the following weight percents: 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, and up to 0.30 but not higher. Thus, any range of any combination of the above-listed weight percents is also acceptable. The weight percents and ranges can be either the $TiO_2$ or ZnO or a combination of them.

Optional Additives

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; impact modifiers; initiators; lubricants; micas; pigments, colorants and dyes; optical brighteners; plasticizers; processing aids; other polymers; release agents; silanes, titanates and zirconates; slip and anti-blocking agents; stabilizers; stearates; ultraviolet light absorbers; viscosity regulators; waxes; and combinations of them.

Any conventional plasticizer, preferably a paraffinic oil, is suitable for use the present invention. The amount of plasticizer oil, if present, significantly influences the hardness of the resulting laser markable TPE of the invention, such that the Shore Hardness as measured using ASTM D2240 (10 seconds) can range from 0 Shore 000 to 80 Shore D Hardness, and preferably from about 3 to about 85 Shore A Hardness. If plasticizer oil is present, the ratio of plasticizer oil to TPE can range from about 2% to about 90%, and preferably from about 5% to about 50%.

A preferred anti-oxidant is an Irganox brand pentaerythritol antioxidant identified as CAS 6683-19-8. A preferred processing stabilizer is an Irgafos brand trisarylphosphite processing stabiliser identified as CAS No. 31570-04-4

When using $TiO_2$ as the preferred laser marking ingredient, it has been found that the use of an optical brightener is helpful to assist in the appearance. A non-limiting example of an optical brightener suitable for use in the present invention is PPN0709692 optical brightener for Clariant Masterbatch of McHenry, Ill., USA.

Processing of the TPE through extruders and molding machines can benefit from the presence of an external lubricant, such as a wax, preferably an erucamide wax commercially available from Chemtura under the brand of Kemamide E wax.

Table 1 shows the acceptable, desirable, and preferable ranges of ingredients for the laser markable TPE of the present invention.

TABLE 1

Ranges of Ingredients

| Ingredient (Wt. Percent) | Acceptable | Desirable | Preferable |
| --- | --- | --- | --- |
| Non-elastomeric olefin | 5-80 | 5-50 | 5-25 |
| Non-crosslinked elastomer | 5-80 | 5-50 | 5-25 |
| Laser markable ingredient | 0.05-0.3 | 0.05-0.2 | 0.05-0.15 |
| Optional plasticizer oil | 0-90 | 15-65 | 15-65 |
| Optional optical brightener | 0-3 | 0.1-3 | 0.1-3 |
| Optional anti-oxidant | 0-0.3 | 0.1-0.2 | 0.1 |
| Optional lubricant wax | 0-0.1 | 0.05-0.09 | 0.08 |
| Other optional Additives | 0-20 | 0.1-10 | 0.1-5 |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 50 to about 1200 revolutions per minute (rpm), and preferably from about 400 to about 800 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit homogenization of the compound components. The mixing speeds range from 60 to 600 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Laser markable TPE of the present invention has an excellent versatility as a compound which can be marked with a UV laser operating in the range of 300 to 400 nanometers, and preferably at about 355 nm, at a distance of from about 5 cm to about 60 cm. At this wavelength range with the laser marking ingredients selected and used in the range of weight percent identified above, the marks are generated on the surface without unduly otherwise affecting the surface of the shaped TPE article being marked with the laser.

The marks are visually perceptible, can be machine perceptible, and can have the added preferred benefit of not overly affecting the overall translucency of the TPE. Because it can be preferable to retain as much translucency as possible for the TPE article, it is significant to the invention as a preferred feature that the addition of the smallest size laser marking ingredient commercially available minimizes the decrease in translucency in those parts of the article which are not marked by the laser activated marking ingredients. As explained above, smaller sizes of $TiO_2$ and ZnO particles are preferred, especially as small as in the micronized or nanometric sizes. While translucency is not a requirement of the present invention, it is preferable when possible.

The laser markable TPE can be used in the molding or extruding or other shaping of plastic articles which benefits from the laser markability of the TPE, which itself has elastomer properties of a fully thermoplastic material.

Markets or industries into which the laser markable TPE can be introduced include appliances (refrigerators, freezers, washers, dryers, toasters, blenders, vacuum cleaners, coffee makers, and mixers); building and construction industries (pipes and fittings, trim, and molding); consumer goods (power hand tools, rakes, shovels, lawn mowers, shoes, boots, golf clubs, fishing poles, and watercraft); electrical/electronic products (printers, computers, business equipment, LCD projectors, mobile phones, connectors, chip trays, circuit breakers, and plugs); healthcare (wheelchairs, beds, testing equipment, analyzers, labware, ostomy goods, intra-venous sets, wound care, drug delivery, inhalers, and packaging); personal care products (toothbrushes, razors, combs, and hair brushes); industrial goods (containers, bottles, drums, material handling, gears, bearings, gaskets and seals, valves, and various safety equipment); packaging (food and beverage containers, food and beverage closure systems, cosmetic, detergents and cleaners, personal care, pharmaceutical and wellness); transportation (automotive aftermarket parts, window seals, and interior compartment parts); and wire and cable (cars and trucks, airplanes, aerospace, construction, military, telecommunication, utility power, alternative energy, and electronics). Of these various possibilities, laser markable TPEs are particularly suitable for synthetic wine corks and other food packaging products of all types.

EXAMPLES

Table 2 shows the sources of ingredients for Examples 1-11 of the present invention and Comparative Examples A-O. Table 3 shows the formulations and resulting properties.

Each Example and Comparative Example was melt-mixed in a twin screw extruder operating in heating zones progressing through a range of 177° C.-205° C. (350° F.-400° F.) and rotating at a speed of 450 rpm. The TPE compound extrudate was pelletized for subsequent molding.

To test the properties, the pellets were molded using an injection molding machine operating at 205° C. (400° F.) temperature and a cycle time of 30 seconds to make plaques have the dimensions of 10 cm×12.5 cm×3 mm.

Each plaque was subjected UV marking using a Samurai Laser Marking System manufactured by DPSS Lasers Inc. of Santa Clara, Calif. USA. The laser marking system generated a pulsed UV laser of 355 nm wavelength, at pulse frequency between 30 kHz to 60 kHz, with an average power of about 1.5 W, a peak power between 100 W and 3 kW, a pulse energy between 3 µJ to 100 µJ and a drawing speed between 500 mm/s to 5000 mm/s.

Each plaque was then evaluated qualitatively for laser marking intensity and translucency. Faint black marks were considered unacceptable.

TABLE 2

| Ingredient Name | Purpose | Brand Name | Generic Name | Commercial Source | Source Location |
| --- | --- | --- | --- | --- | --- |
| G1651HU | SBC elastomer | Kraton G1651HU | | Kraton | Houston, TX |
| PD 702 | hPP discontinuous phase | Profax PD 702 | 35 MFI PP hompolymer | Lynodell-Basell | Beaumont, TX |
| 1102KR | hPP discontinuous phase | Formolene 1102KR | 4 MFI PP hompolymer | Formosa Plastics | Point Comfort, TX |
| 7823M | rPP discontinuous phase | Fina 7823M | 30 MFI Random Copolymer | Total | Houston, TX |
| D9007.10 | OBC elastomer | Infuse D9007.10 | Olefin Block Copolymer | Dow Chemical | Midland, MI |
| D9100 | OBC elastomer | Infuse D9100 | Olefin Block Copolymer | Dow Chemical | Midland, MI |
| 500 viscosity tech grade oil | Plasticizer | Parol 500 | 500 viscosity tech oil | Calumet Specialty Products Partners | Karns City, PA |
| 550 viscosity USP oil | Plasticizer | Puretol 550 | 500 viscosity USP oil | PetroCanada | Canada |
| Irgafos 168 | Antioxidant | Irgafos 168 | | Ciba (part of BASF) | Basel, Switzerland |
| Irganox 1010 | Antioxidant | Irganox 1010 | | Ciba (part of BASF) | Basel, Switzerland |
| Kemamide E Ultra | Lubricant | Kemamide E Ultra | Erucamide wax | Chemtura | Middlebury, CT |
| CSEBS 446 (White) | Laser Marking Ingredient | CSEBS 446 (White) | Color concentrate | ECM | Worcester, MA |
| PPN0709692 | Optical Brightener | PPN0709692 | | Clariant Masterbatch | McHenry, IL |
| ZEHT1003PP | Laser Marking Ingredient | ZEHT1003PP | ZnO nano particle dispersed in PP | Nanophase Technologies Corporation | Romeoville, IL |

TABLE 2-continued

| Ingredients | | | | | |
|---|---|---|---|---|---|
| Ingredient Name | Purpose | Brand Name | Generic Name | Commercial Source | Source Location |
| MT-100S | Laser Marking Ingredient | MT-100S | Micronized $TiO_2$ | Tayca Corporation | Japan |

TABLE 3

Formulations and Properties

| Example | | A | B | 1 | 2 | 3 | 4 | 5 |
|---|---|---|---|---|---|---|---|---|
| 7823M | rPP discontinuous phase | 20.16% | 19.96% | 20.15% | 19.54% | 19.54% | 20.13% | 19.93% |
| D9007.10 | OBC elastomer | 52.42% | 51.90% | 52.38% | 50.80% | 50.80% | 52.34% | 51.82% |
| D9100 | OBC elastomer | 8.06% | 7.99% | 8.06% | 7.82% | 7.82% | 8.05% | 7.97% |
| 550 viscosity USP oil | Plasticizer | 19.35% | 19.16% | 19.34% | 18.76% | 18.76% | 19.33% | 19.13% |
| CSEBS 446 (White) | Laser Marking Ingredient | 0.00% | 0.00% | 0.07% | 0.07% | 0.07% | 0.15% | 0.15% |
| PPN0709692 | Optical Brightener | 0.00% | 0.99% | 0.00% | 3.01% | 3.01% | 0.00% | 0.99% |
| ZEHT1003PP | Laser Marking Ingredient | 0.00% | 0.00% | 0.00% | 0.00% | 0.00% | 0.00% | 0.00% |
| Percent and Type of Laser Marking Ingredient | | 0.00% | 0.00% | 0.05% $TiO_2$ | 0.05% $TiO_2$ | 0.05% $TiO_2$ | 0.10% $TiO_2$ | 0.10% $TiO_2$ |
| TPE Substrate Visual Appearance | | Translucent | Translucent | Partially Translucent | Partially Translucent | Partially Translucent | Opaque | Opaque |
| Laser Marking Intensity | | None Visible | None Visible | Medium Black Mark | Medium Black Mark | Medium Black Mark | Strong Black Mark | Strong Black Mark |

| Example | | C | D | 6 | 7 | E | 8 | F |
|---|---|---|---|---|---|---|---|---|
| G1651HU | SBC elastomer | 26.79% | 26.79% | 26.75% | 27.32% | 27.62% | 27.58% | 26.79% |
| PD 702 | hPP discontinuous phase | 5.28% | 5.28% | 5.28% | 5.39% | 5.45% | 5.44% | 5.28% |
| 1102KR | hPP discontinuous phase | 3.64% | 3.64% | 3.64% | 3.72% | 3.76% | 3.75% | 3.64% |
| 500 viscosity tech grade oil | Plasticizer | 61.09% | 61.09% | 61.00% | 62.30% | 62.98% | 62.89% | 61.08% |
| Irganox 1010 | Antioxidant | 0.11% | 0.11% | 0.11% | 0.11% | 0.11% | 0.11% | 0.11% |
| Kemamide E Ultra | Lubricant | 0.08% | 0.08% | 0.08% | 0.08% | 0.08% | 0.08% | 0.08% |
| CSEBS 446 (White) | Laser Marking Ingredient | 0.00% | 0.00% | 0.15% | 0.07% | 0.00% | 0.15% | 0.02% |
| PPN0709692 | Optical Brightener | 3.00% | 3.00% | 3.00% | 1.01% | 0.00% | 0.00% | 3.00% |
| Percent and Type of Laser Marking Ingredient | | 0.00% | 0.00% | 0.10% $TiO_2$ | 0.05% $TiO_2$ | 0.00% | 0.10% $TiO_2$ | 0.01% $TiO_2$ |
| TPE Substrate Visual Appearance | | Highly Translucent | Highly Translucent | Barely Translucent/ Mostly Opaque | Partially Translucent | Highly Translucent | Barely Translucent/ Mostly Opaque | Translucent |
| Laser Marking Intensity | | None Visible | None Visible | Strong Black Mark | Medium Black Mark | None Visible | Strong Black Mark | Faint Black Mark |

| Example | | G | H | 9 | I |
|---|---|---|---|---|---|
| 7823M | rPP discontinuous phase | 20.16% | 20.13% | 20.09% | 19.49% |
| D9007.10 | OBC elastomer | 52.42% | 52.33% | 52.25% | 50.66% |
| D9100 | OBC elastomer | 8.06% | 8.05% | 8.04% | 7.79% |
| 550 viscosity USP oil | Plasticizer | 19.35% | 19.32% | 19.29% | 18.71% |
| ZEHT1003PP | Laser Active particle | 0.00% | 0.17% | 0.33% | 3.35% |
| Percent and Type of Laser Marking Ingredient | | 0.00% | 0.05% nano ZnO | 0.10% nano ZnO | 1.0% nano ZnO |
| TPE Substrate Visual Appearance | | Translucent | Translucent | Translucent | Barely Translucent/ Mostly Opaque |
| Laser Marking Intensity | | None Visible | Faint Yellow Brown Mark | Medium Brown Mark | Strong Yellow Brown Mark |

TABLE 3-continued

Formulations and Properties

| Example | | J | K | 10 | L |
|---|---|---|---|---|---|
| 7823M | rPP discontinuous phase | 20.16% | 20.15% | 20.14% | 20.06% |
| D9007.10 | OBC elastomer | 52.42% | 52.39% | 52.36% | 52.16% |
| D9100 | OBC elastomer | 8.06% | 8.06% | 8.06% | 8.02% |
| 550 viscosity USP oil | Plasticizer | 19.35% | 19.35% | 19.33% | 19.26% |
| MT-100S | Laser Active particle | 0.00% | 0.05% | 0.10% | 0.50% |
| Percent and Type of Laser Marking Ingredient | | 0.00% | 0.05% micro $TiO_2$ | 0.10% micro $TiO_2$ | 0.50% micro $TiO_2$ |
| TPE Substrate Visual Appearance | | Translucent | Translucent | Translucent | Partially Translucent |
| Laser Marking Intensity | | None Visible | Faint Black Mark | Medium Black Mark | Strong Black Mark |

| Example | | M | N | 11 | O |
|---|---|---|---|---|---|
| G1651HU | SBC elastomer | 27.62% | 27.61% | 27.60% | 27.48% |
| PD 702 | hPP discontinuous phase | 5.45% | 5.44% | 5.44% | 5.42% |
| 1102KR | hPP discontinuous phase | 3.76% | 3.75% | 3.75% | 3.74% |
| 500 viscosity tech grade oil | Plasticizer | 62.98% | 62.95% | 62.92% | 62.66% |
| Irganox 1010 | Antioxidant | 0.11% | 0.11% | 0.11% | 0.11% |
| Kemamide E Ultra | Lubricant | 0.08% | 0.08% | 0.08% | 0.08% |
| MT-100S | Laser Marking Ingredient | 0.00% | 0.05% | 0.10% | 0.50% |
| Percent and Type of Laser Marking Ingredient | | 0.00% | 0.05% micro $TiO_2$ | 0.10% micro $TiO_2$ | 0.50% micro $TiO_2$ |
| TPE Substrate Visual Appearance | | Highly Translucent | Highly Translucent | Highly Translucent | Partially Translucent |
| Laser Marking Intensity | | None Visible | Faint Black Mark | Medium Black Mark | Strong Black Mark |

All Examples and Comparative Examples demonstrated the importance of laser marking intensity and the preference of at least partial translucency. Examples 1-3 are superior Comparative Examples A-B. Examples 2 and 3 have different amounts of laser marking ingredient, while Examples 1 and 2 have a difference of optical brightener being included in the latter. Example 4 does not include optical brightener, compared with Example 3, causing a stronger black marking to be noticed. Examples 4 and 5 also differ by the presence of optical brightener in Example 5.

The results of Examples 6-8 demonstrated that a variety of translucencies can be obtained with operating within a laser marking ingredient amount ranging from 0.05% to 0.10%.

The results of Example 9 demonstrated that one can obtain both a medium brown mark and retained translucency with 0.10% of ZnO laser marking ingredient. The results of Example 10 demonstrated the same for 0.10% of $TiO_2$. The difference in color of marking in Examples 9 and 10 between ZnO (brown) and $TiO_2$ (black) allows for a difference in color marking to be chosen for different TPE articles subjected to laser marking at the same or similar wavelength.

The results of Examples 9-11 demonstrated that the present invention performs acceptably at 0.10% laser marking ingredient whether the elastomer is SBC or OBC (Example 11 vs. Examples 9-10, respectively), whether the discontinuous phase is hPP or rPP olefin (Example 11 vs. Examples 9-10, respectively), and whether the laser marking ingredient is $TiO_2$ or ZnO (Examples 10-11 vs. Example 9, respectively).

Employing Examples 1-11, particularly also considering Comparative Examples A-O which indicate what is not acceptable, without under experimentation, a person having ordinary skill in the art can choose from various olefinic non-elastomeric discontinuous phase polymers, various non-crosslinked elastomers, and from laser marking ingredients of either $TiO_2$ (0.05-0.10 weight percent) or ZnO (0.1-0.3 weight percent), particularly in smaller particle sizes, in order to practice the considerable and unexpected benefits of the present invention. At least visually perceptible medium black marks can be obtained, preferably while retaining as much translucency as possible.

The invention is not limited to the above embodiments. The claims follow.

What is claimed is:

1. A UV laser markable thermoplastic elastomer compound, comprising:
    (a) a non-elastomeric polyolefin present in an amount of from about 5 to about 35 weight percent of the compound;
    (b) a non-crosslinked elastomer present in an amount of from about 25 to about 75 weight percent of the compound; and
    (c) a laser marking ingredient active in the range of wavelength of a UV laser, selected from the group consisting of (1) titanium dioxide present in an amount of from about 0.05 to about 0.1 weight percent of the compound and (2) zinc oxide present in an amount of from about 0.1 to 0.3 weight percent of the compound.

2. The compound of claim 1, wherein the non-crosslinked elastomer is selected from the group consisting of styrene block copolymer and olefin block copolymer.

3. The compound of claim 1, wherein the non-elastomeric polyolefin is selected from the group consisting of polypropylene homopolymer and polypropylene random copolymer.

4. The compound of claim 1, wherein the non-crosslinked elastomer is olefin block copolymer.

5. The compound of claim 4, wherein the non-elastomeric polyolefin is polypropylene random copolymer.

6. The compound of claim 3, further comprising optical brightener.

7. The compound of claim 3, further comprising plasticizer oil.

8. The compound of claim 3, further comprising lubricant.

9. The compound of claim 6, further comprising 15-65 wt % of plasticizer oil, 0.1-3 wt % of optical brightener, 0.05-0.09 wt % of lubricant wax, 5-30 wt % of non-elastomeric olefin, 25-70 wt % of non-crosslinked elastomer, and 0.05-0.2 wt % of laser markable ingredient based on the weight percent of the compound.

10. A thermoplastic elastomer article shaped from the compound of claim 1.

11. The article of claim 10, wherein the article is molded.

12. The article of claim 10, wherein the article is extruded.

13. The article of claim 10 wherein the article is markable by a laser operating from about 300 nm to about 400 nm wavelength.

14. The article of claim 13, wherein the article is at least partly translucent.

15. The article of claim 10, wherein the article is selected from the group consisting of appliances, building and construction products, consumer goods, electrical/electronic products, healthcare products, personal care products, industrial goods, packaging, transportation, and wire and cable products.

16. The article of claim 10, wherein the article is a synthetic wine cork.

17. The article of claim 10, wherein the laser marking is black if titanium dioxide is used as the laser marking ingredient or brown if zinc oxide is used as the laser marking ingredient.

18. The compound of claim 2, wherein the non-elastomeric polyolefin is selected from the group consisting of polypropylene homopolymer and polypropylene random copolymer.

19. The article of claim 10, wherein the non-crosslinked elastomer of the compound is selected from the group consisting of styrene block copolymer and olefin block copolymer and wherein the non-elastomeric polyolefin of the compound is selected from the group consisting of polypropylene homopolymer and polypropylene random copolymer.

* * * * *